*(12)* United States Patent
Kim et al.

(10) Patent No.: US 12,255,732 B2
(45) Date of Patent: Mar. 18, 2025

(54) METHODS AND APPARATUS FOR SUCCESSIVE INTERFERENCE CANCELLATION (SIC)

(71) Applicant: Marvell Asia Pte, Ltd., Singapore (SG)

(72) Inventors: Hong Jik Kim, San Jose, CA (US);
Timothy Shee Yao, Sunnyvale, CA (US); Nagabhushana Rao Kurapati, Milpitas, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 18/229,140

(22) Filed: Aug. 1, 2023

(65) Prior Publication Data

US 2023/0379074 A1 Nov. 23, 2023

Related U.S. Application Data

(63) Continuation of application No. 17/535,906, filed on Nov. 26, 2021, now Pat. No. 11,757,553, which is a continuation of application No. 16/994,227, filed on Aug. 14, 2020, now Pat. No. 11,223,441.

(60) Provisional application No. 62/886,822, filed on Aug. 14, 2019.

(51) Int. Cl.
*H04L 1/02* (2006.01)
*H04B 7/0413* (2017.01)
*H04J 11/00* (2006.01)
*H04L 1/00* (2006.01)
*H04L 25/03* (2006.01)

(52) U.S. Cl.
CPC .......... *H04J 11/004* (2013.01); *H04B 7/0413* (2013.01); *H04L 1/0048* (2013.01); *H04L 1/0061* (2013.01); *H04L 25/03006* (2013.01)

(58) Field of Classification Search
CPC ... H04B 7/0413; H04B 1/7103; H04L 1/0061; H04L 25/0204; H04J 11/005
USPC .......................................... 375/267, 260, 262
See application file for complete search history.

(56) References Cited

U.S. PATENT DOCUMENTS

| | | | |
|---|---|---|---|
| 2016/0373767 A1* | 12/2016 | Yang | H04N 19/593 |
| 2017/0070936 A1* | 3/2017 | Zhang | H04W 52/245 |
| 2018/0183627 A1* | 6/2018 | Wei | H04L 27/2657 |
| 2019/0261237 A1* | 8/2019 | Yamazaki | H04W 36/023 |

* cited by examiner

*Primary Examiner* — Khai Tran
(74) *Attorney, Agent, or Firm* — JW Law Group; James M. Wu (57) ABSTRACT

Methods and apparatus for successive interference cancellation (SIC). In an embodiment, a method includes receiving symbols from a plurality of user equipment (UE), identify a target UE and non-target UEs, decoding code blocks from the symbols received from the non-target UEs to generate decoded bits for each code block. The method also includes performing a CRC check on each code block to generate a tag (0) when the CRC check passes and a tag (1) when the CRC check fails, and re-encoding the decoded bits to generate re-encoded code blocks having the associated tags attached. The method also includes reconstructing symbols from the re-encoded code blocks where symbols reconstructed from re-encoded code blocks having tag (0) are reconstructed with data and symbols reconstructed from re-encoded code blocks having tag (1) are reconstructed as zero value symbols, and utilizing the reconstructed symbols to cancel interference on symbols from the target UE.

30 Claims, 5 Drawing Sheets

METHODS AND APPARATUS FOR SUCCESSIVE INTERFERENCE CANCELLATION (SIC)

PRIORITY

This is a divisional application of a U.S. patent application having a U.S. patent application Ser. No. 17/535,906, filed on Nov. 26, 2021 in the name of same inventor and entitled "Methods and Apparatus for Successive Interference Cancellation (SIC)," issued into a U.S. patent with a U.S. Pat. No. 11,757,553, which is a continuation patent application of a U.S. patent application having a U.S. patent application Ser. No. 16/994,227, filed on Aug. 14, 2020 in the name of the same inventor and entitled "Methods and Apparatus for Successive Interference Cancellation (SIC)," issued into a U.S. patent with a U.S. Pat. No. 11,223,441, which further claims the benefit of priority under 35 U.S.C. § 119 based upon U.S. Provisional Patent Application No. 62/886,822, filed on Aug. 14, 2019, and entitled "Hardware Based Successive Interference Cancellation (SIC) Using Modulation Symbols Tagged with Code Block (CB) Cyclic Redundancy (CRC) Result," all of which are hereby incorporated herein by reference in their entirety.

FIELD

The exemplary embodiments of the present invention relate to the operation of telecommunications networks. More specifically, the exemplary embodiments of the present invention relate to receiving and processing data streams via a wireless communication network.

BACKGROUND

With the rapidly growing trend of mobile and remote data access over high-speed communication networks, such as provided by long term evolution (LTE) cellular networks, the accurate delivery and deciphering of data streams has become increasingly challenging and difficult. For example, in LTE, 5G and other wireless communication systems, transmitted payload data are segmented into Transport Blocks (TBs). A TB cyclic redundancy check (CRC) value is attached to the TB that allows a receiver to determine if the TB is received correctly. Each TB with attached TB CRC is further divided into a number of Code Blocks (CBs), each having their own CRC bits.

In conventional systems, such as in a multiple input multiple output (MIMO) system, a base station receiver processes transport blocks received in uplink signals from multiple user equipment (UE). The uplink signals received at the base station receiver can interfere with each other making reception and decoding of a transport block from a target UE difficult. For example, uplink transmissions from non-target UEs form interference is difficult to successfully decode or demodulate transport blocks from the target UE.

Therefore, it is desirable to have a way to mitigate interference from non-target UEs when receiving an uplink transmission from a target UE.

SUMMARY

In various exemplary embodiments, methods and apparatus are provided for successive interference canceling that cancels interference on an uplink transmission from a target UE. During operation, code blocks from non-target UE are received and decoded. The decoded bits are tagged to indicate whether or not the received code blocks passed a CRC check and were successfully decoded. For example, bits from successfully decoded code blocks are tagged with (0) and bits from unsuccessfully decoded code blocks are tagged with (1). The decoded bits are re-encoded to generate re-encoded code blocks that have their associated tags attached. The re-encoded code blocks are used to reconstruct symbols. The symbols reconstructed from re-encoded code blocks tagged (0) are filled with data and the symbols reconstructed from re-encoded code blocks tagged (1) are zero filled. The resulting symbols are input to a successive interface canceller that generates an interference signal that is output to an equalizer. The equalizer is used to remove the interference signal on uplink transmissions from the target UE.

In an embodiment, a method is provided that comprises receiving symbols from a plurality of user equipment (UE), identifying a target UE and non-target UEs, decoding code blocks from the symbols received from the non-target UEs to generate decoded bits for each code block. The method also includes performing a CRC check on the decoded bits of each code block to generate a tag (0) when the CRC check passes and a tag (1) when the CRC check fails, and re-encoding the decoded bits to generate re-encoded code blocks having the associated tags attached. The method also includes reconstructing symbols from the re-encoded code blocks so that symbols reconstructed from re-encoded code blocks having tags (0) are reconstructed with data and symbols having tags (1) are reconstructed as zero value symbols, and utilizing the reconstructed symbols to cancel interference on symbols from the target UE.

In an embodiment, an apparatus is provided that comprises a receiver that receives symbols from a plurality of user equipment (UE), and a decoder that decodes code blocks received in the symbols from non-target UE to generate decoded bits for each code block, and where the decoder performs a CRC check on the decoded bits for each code block to generate a tag, and wherein the tag for each code block has a first state (0) when the CRC check passes and a second state (1) when the CRC check fails. The apparatus also comprises a re-encoding that re-encodes the decoded bits to generate re-encoded code blocks. The tags associated with the code blocks are attached to the re-encoded code blocks, respectively. The apparatus also comprises a symbol reconstruction circuit that reconstructs symbols from the re-encoded code blocks. The symbols reconstructed from re-encoded code blocks having tag (0) are reconstructed with data and symbols reconstructed from re-encoded code blocks having tag (1) are reconstructed as zero value symbols. The apparatus also comprises a successive interference canceller (SIC) that utilizes the reconstructed symbols to cancel interference on the symbols from a target UE.

Additional features and benefits of the exemplary embodiments of the present invention will become apparent from the detailed description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and business related constraints, and that these specific goals will vary from one implementation to another and from one developer to another. Moreover, it will be understood that such a development effort might be complex and time-consuming, but would nevertheless be a routine undertaking of engineering for those of ordinary skill in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

Figure 1:
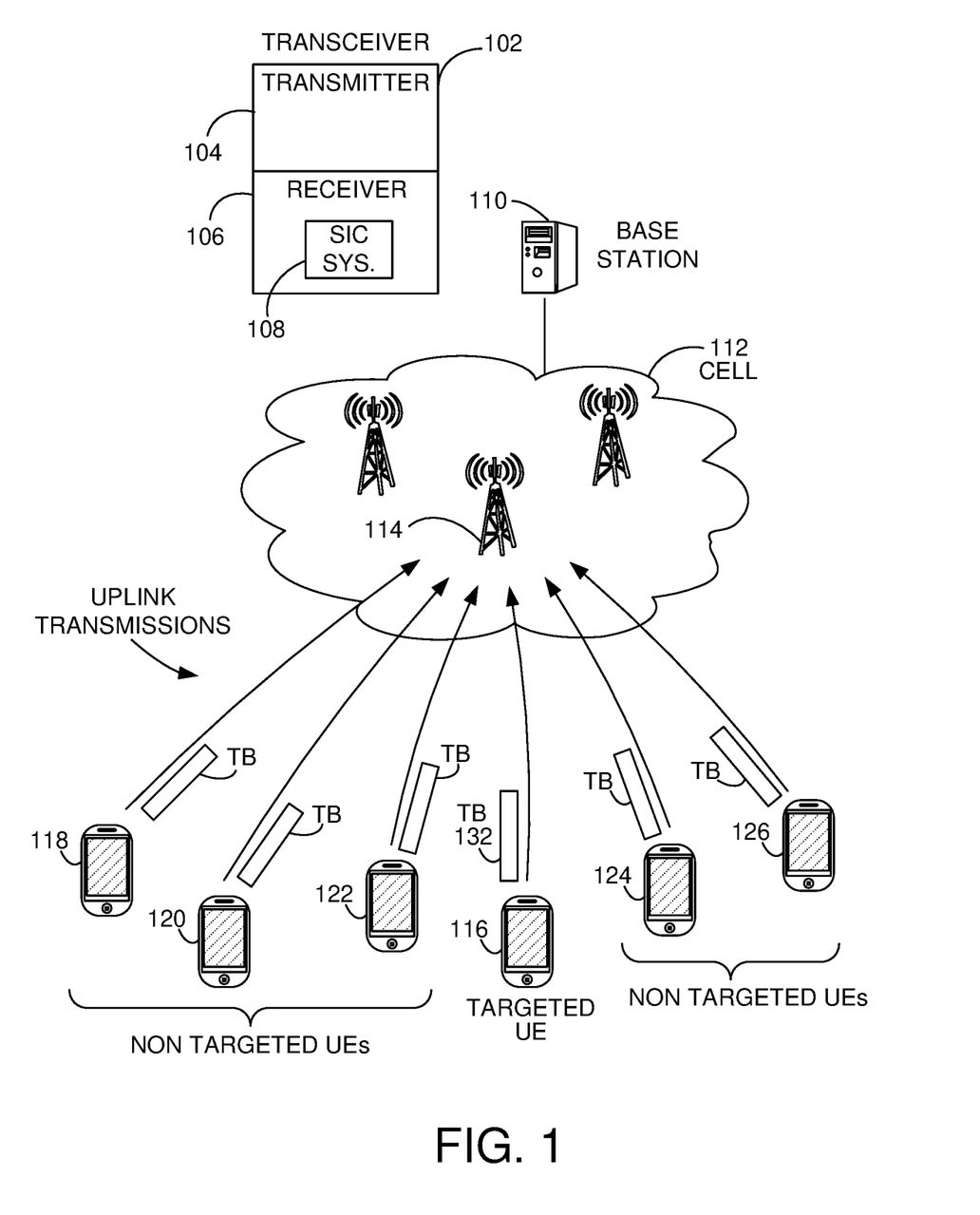
FIG. 1 shows a communication network comprising a transceiver having an exemplary embodiment of a successive interference cancellation (SIC) system.

FIG. 1 shows a communication network 100 comprising a transceiver 102 having an exemplary embodiment of a successive interference cancellation (SIC) system 108. The transceiver 102 has a transmitter portion 104 and a receiver portion 106. The base station 110 is configured to communicate with UE using radio towers, such as radio tower 114, located in cell site 112.

Also shown in FIG. 1 are various UEs configured to communicate with the base station 110. Each UE transmits uplink transmissions that include a transport block (TB). For example, the UE 116 transmits the TB 132 in an uplink transmission to the base station 110. Each TB can comprise a plurality of code blocks (CB). However, since the base station 110 receives uplink transmissions from multiple UEs, the uplink signals can interfere with each other at the receiver 106, for instance, in a MIMO environment. Thus, to correctly decode and/or demodulate uplink transmissions from a target UE 116, the interfering transmissions from non-target UEs (i.e., UEs 118-126) should be canceled, removed, or mitigated as much as possible.

In various embodiments, the SIC system 108 is configured to process code blocks (CBs) received from non-target user equipment to perform interference cancellation to improve receiver performance when receiving symbols from a target UE.

In an exemplary embodiment, the SIC system 108 reconstructs an interference signal based on received and decoded code blocks from non-target UEs. A reconstructed interference signal derived from one or more non-target UE is sent out to the receiver front-end or equalizer for cancellation before a second round of equalization. This process is called successive interference cancellation (SIC). Thus, the interference from uplink transmissions received from non-target UEs is removed or canceled from an uplink transmission received from a target UE.

As illustrated in FIG. 1, UEs 116, 118, 120, 122, 124, and 126 can be cellular phones, handheld devices, tablet computers or iPad® devices. It should be noted that the underlying concepts of the exemplary embodiments of the present invention would not change if one or more blocks (or devices) were added or removed from the communication network 100. A more detailed description of the SIC system 108 is provided below.

Figure 2:
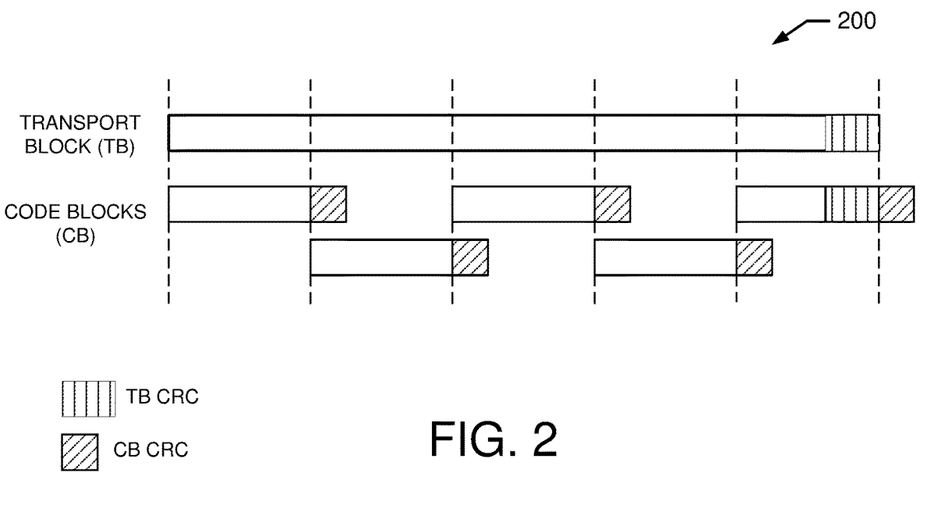
FIG. 2 shows an exemplary diagram of a transport block received in an uplink transmission from UE.

FIG. 2 shows an exemplary diagram of a transport block 200 received in an uplink transmission from a UE. Each user equipment transmits payload data that is segmented into transport blocks. A TB cyclic redundancy check (CRC) value is attached to each TB that allows a receiver to determine if the TB is received correctly. Each TB with attached TB CRC is further divided into a number of Code Blocks (CBs). Each CB is encoded separately and includes its own CB CRC value that allows the receiver to check if a CB is received correctly. During operation of the SIC system 108, code blocks received from one or more non-target UEs are used to reconstruct symbols that form a cancellation signal that is removed from symbols received from a target UE. Thus, even if a TB CRC check fails, the code blocks within the TB may still pass their respective CRC checks. In various embodiments, successfully received code blocks from non-target UE are utilized to form the cancellation signal.

Figure 3:
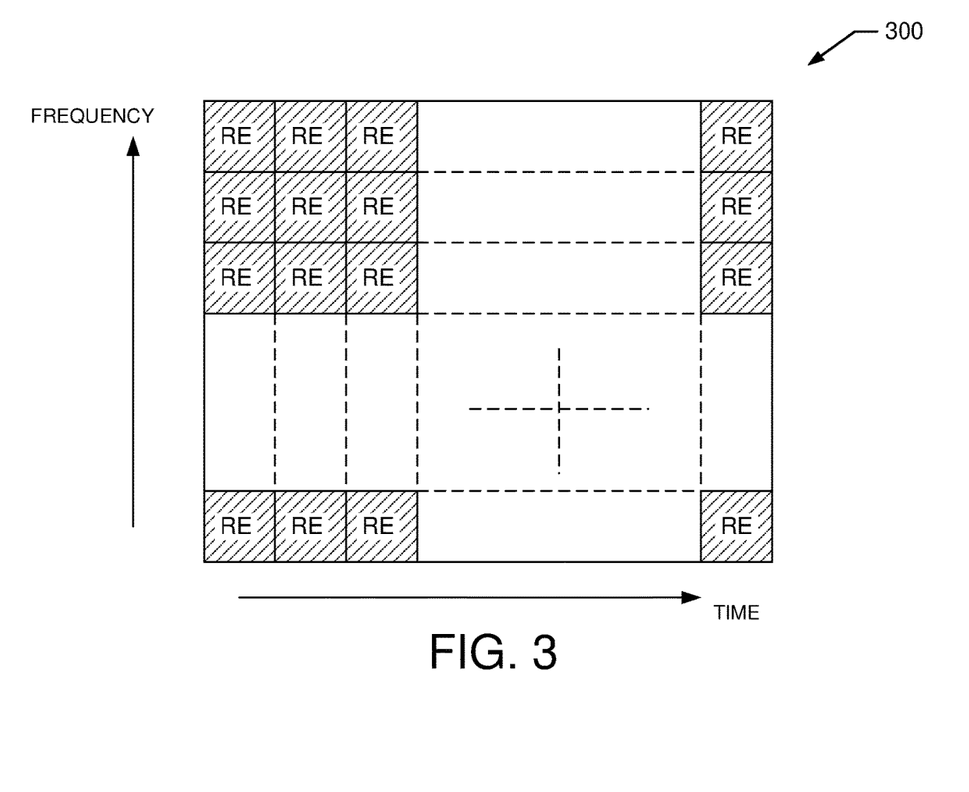
FIG. 3 shows an exemplary embodiment of a transmission slot that is used in uplink communications from UE.

FIG. 3 shows an exemplary embodiment of a transmission slot 300 in which transport blocks are received at a receiver. The transmission slot 300 comprises a plurality of resource elements (RE) arranged by time and frequency. Each resource block contains a frequency domain (FD) symbol.

Figure 4:
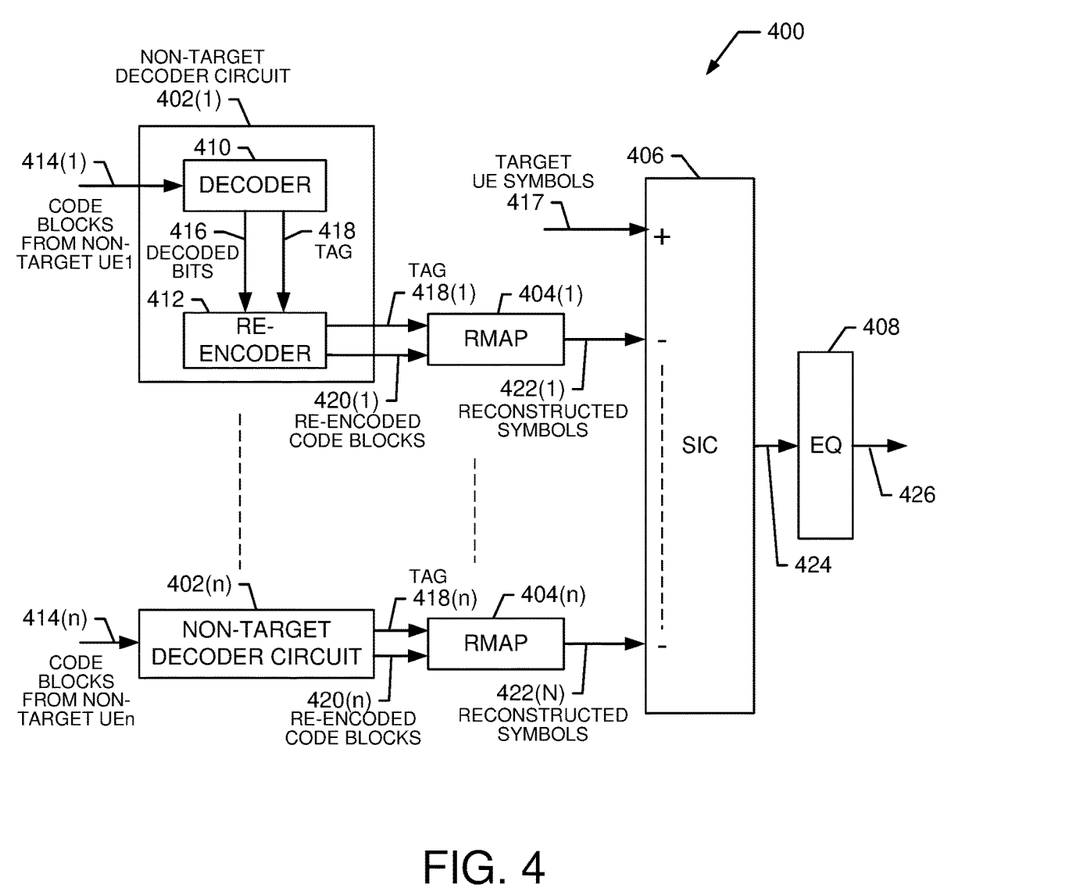
FIG. 4 shows an exemplary embodiment of an SIC apparatus.

FIG. 4 shows a detailed exemplary embodiment of an SIC apparatus 400. For example, the SIC apparatus 400 is suitable for within the SIC system 108 shown in FIG. 1. In an embodiment, the SIC apparatus 400 comprises non-target decoder circuits 402(1-$n$), re-mapper (RMAP) circuits 404 (1-$n$), successive interference canceller circuit 406, and equalizer 408.

During operation, a target UE and one or more non-target UEs are identified. Code blocks 414 of non-target UEs are input to non-target decoding circuits 402(1-$n$). Each decoding circuit 402 comprises a decoder 410 and a re-encoder 412. The code blocks 414 are decoded by the decoder 410 and the decoded bits 416 are input to a re-encoder 412. Each of the decoders 410 performs a CRC check on the decoded bits 416 and generates a tag 418 that indicates whether or not the decoded bits were received accurately. For example, when a code block is successfully decoded (e.g., decoded bits pass the CRC check) then the tag 418 is set to a value of (0). When a code block is not successfully decoded (e.g., decoded bits fail the CRC check) then the tag 418 is set to a value of (1).

In an embodiment, each encoder 412 then re-encodes the bits 416 it receives to generate re-encoded code blocks 420. The re-encoder 412 attaches the tag generated for those re-encoded code blocks. The re-encoded code blocks 420 with attached tags 418 are output from the re-encoders 412 and input to the RMAP circuits 404(1-$n$), respectively.

In an embodiment, the RMAP circuits 404(1-$n$) reconstruct symbols 422(1-$n$) from the re-encoded code blocks 420(1-$n$). The RMAP circuits 404(1-$n$) perform a process of converting a binary sequence to non-binary valued symbols for transmission in 5G/LTE systems. The RMAP can also be a symbol reconstruction circuit that reconstructs symbols. Each RMAP circuit reconstructs symbols based on the tags associated with the re-encoded code blocks. For example, if a tag indicates that the associated re-encoded code block is based on a successfully decoded code block (i.e., tag=0), then the RMAP circuit reconstructs a symbol from that code block as normal to contain that data. If a tag indicates that the associated re-encoded code block is based on an unsuccessfully decoded code block (i.e., tag=1), then the RMAP circuit reconstructs a symbol from that code block with zero values so that these symbols will not adversely impact the interference cancelling that will occur in a subsequent process.

In an embodiment, the SIC circuit 406 receives the reconstructed symbols 422(1-$n$) and the symbols 417 from the target UE. The SIC 406 enables inference cancelling by subtracting the interference signals of non-target UEs, which are generated based on the reconstructed symbols 422(1-$n$), from the interfered signal, which is generated based on the target UE symbols 417, to generate an interference-canceled signal 424 that is input to the equalizer (EQ) 408 to further remove ISI (inter-symbol-interference) caused by the communication channels.

Figure 5:
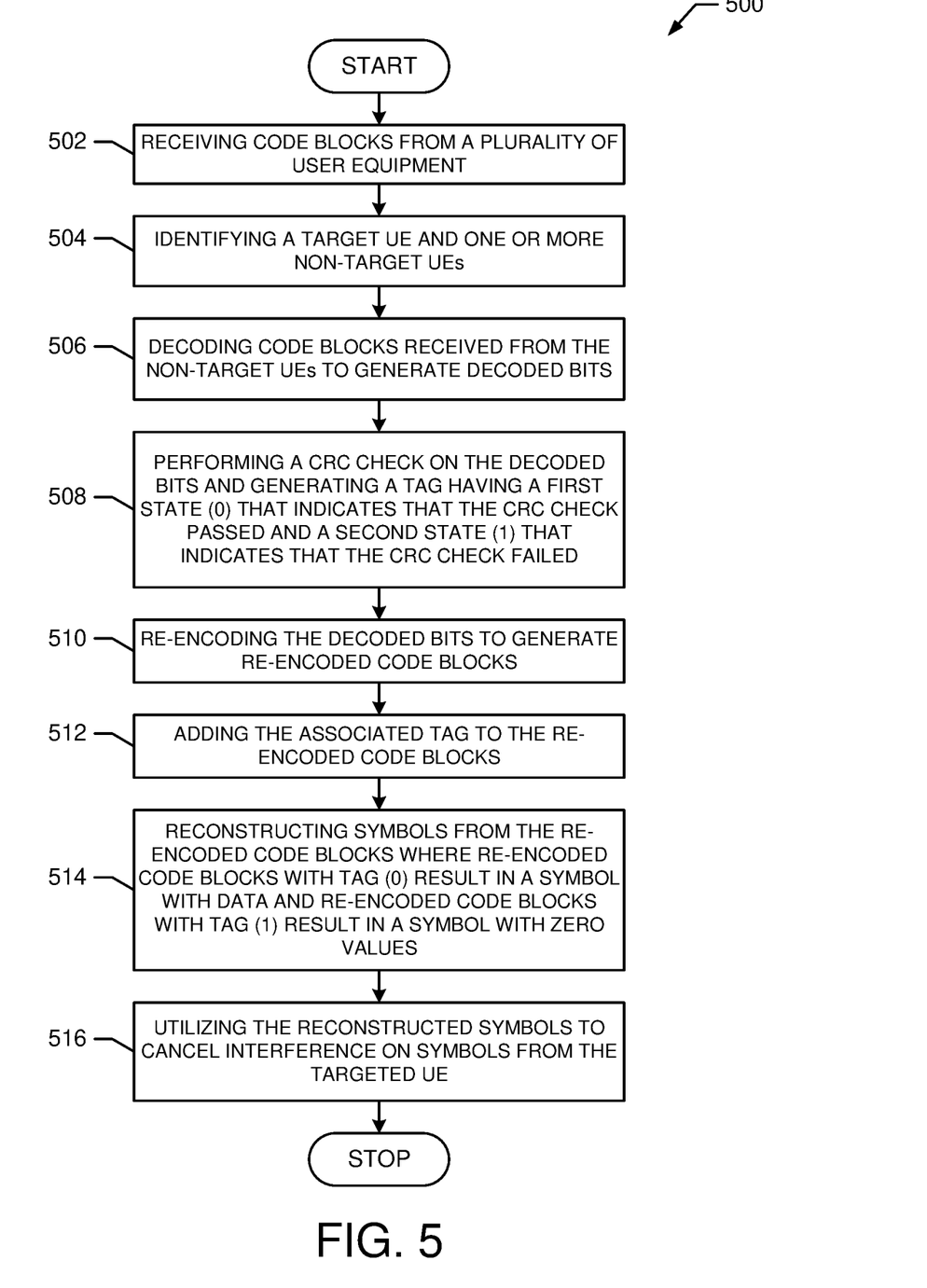
FIG. 5 shows an exemplary embodiment of a method for utilizing code blocks received from non-target UEs to cancel interference on symbols received from a target UE.

FIG. 5 shows an exemplary embodiment of a method 500 for utilizing code blocks that are successfully received from non-target UEs to cancel interference on symbols received from a target UE. For example, in an exemplary embodiment, the method 500 is suitable for use by the SIC system 108 shown in FIG. 1 and SIC system 400 shown in FIG. 4.

At block 502, a plurality of code blocks are received in uplink transmissions from a plurality of user equipment. For example, the receiver portion 106 shown in FIG. 1 receives code blocks from a plurality of the UEs 116-126 shown in FIG. 1.

At block 504, one of the UE is identified as a target UE and the remaining UE are identified as non-target UE. For example, UE 116 is identified as the target UE and one or more of the UEs 118-126 are identified as non-target UEs.

At block 506, code blocks received from non-target UE are decoded to generate decoded bits. For example, code blocks from the non-target UEs are input to non-target decoders 402 where a decoder circuit, such as decoder circuit 410 decodes the non-target code blocks to generate decoded bits 416.

At block 508, a CRC check is performed on the decoded bits to determine if the code block has been successfully received. A tag is generated for each decoded code block. The tag is set to a first state (0) if the code block passes the CRC check and a second state (1) if the code block fails the CRC check. In an embodiment, the decoder circuit 410 performs this function.

At block 510, the decoded bits are re-encoded to generate re-encoded code blocks. For example, the re-encoder circuit 412 performs this function and outputs re-encoded code blocks 420.

At block 512, the associated tag is added to each re-encoded code block. For example, the re-encoder 412 attaches the appropriate tag to each re-encoded code block and outputs the re-encoded code blocks 420 with their associated tags 418.

At block 514, symbols are reconstructed from the re-encoded code blocks. For example the RMAP circuit 404 receives the re-encoded code blocks 420 and the tags 418 and reconstructs symbols 422 from the re-encoded code blocks 420. During the reconstruction, re-encoded code blocks with a tag (0) result in a symbol with data and re-encoded code blocks with a tag (1) result in symbols with zero values At block 516, the reconstructed symbols are utilized to cancel interference on symbols received from the targeted UE. For example, the reconstructed symbols 422 are input to the SIC circuit 406 and are used to cancel interference on symbols 417 received from the target UE.

Thus, the method 500 operates to utilize code blocks received from non-target UEs to cancel interference on symbols received from a target UE. The operations of the method are exemplary and not limited to those shown. For example, the operations can be re-arranged, added to, deleted, or otherwise modified within the scope of the embodiments.

Figure 6:
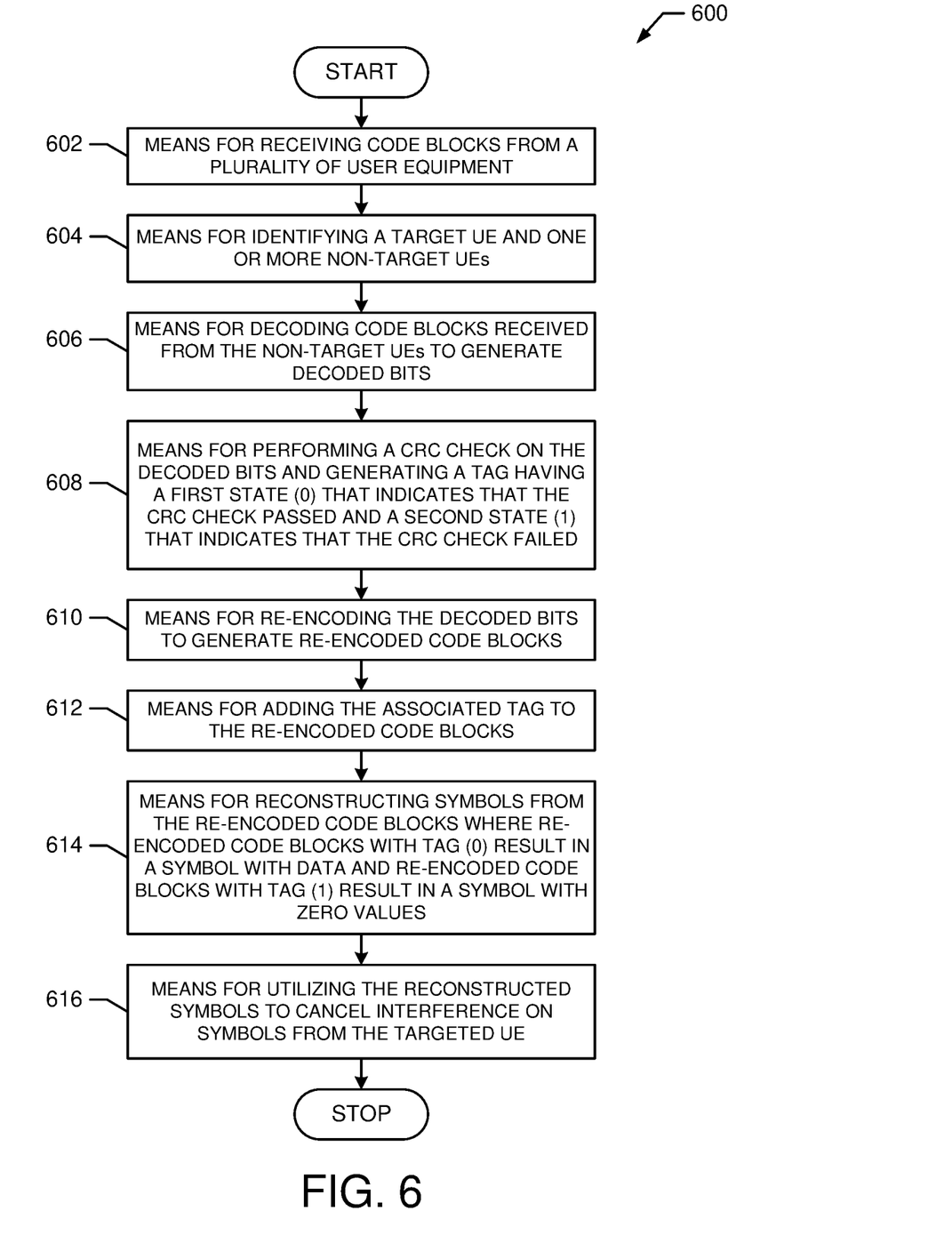
FIG. 6 shows an exemplary embodiment of an SIC apparatus.

FIG. 6 shows a detailed exemplary embodiment of an SIC apparatus 600. For example, the SIC apparatus 600 is suitable for within the SIC system 108 shown in FIG. 1.

In an embodiment, the apparatus 600 comprises means (602) for receiving code blocks from a plurality of user equipment, which in an embodiment comprises decoders 402. The apparatus 600 also comprises means (604) for identifying a target UE and one or more non target UE, which in an embodiment comprises the decoders 402. The apparatus 600 also comprises means (606) for decoding blocks received from the non-target UE to generate decoded bits, which in an embodiment comprises the decoders 402. The apparatus 600 also comprises means (608) for performing a CRC check on the decoded bits and generating a tag having a first state (0) that indicates that the CRC check past and a second state (1) that indicates that the CRC check failed, which in an embodiment comprises the decoders 410. The apparatus 600 also comprises means (610) for a re-encoding the decoded pets to generate re-encoded code blocks, which in an embodiment comprises the encoders 412. The apparatus 600 also comprises means (612) for adding the associated tag to the re-encoded code blocks, which in an embodiment comprises the encoders 412. The apparatus 600 also comprises means (614) for reconstructing symbols from the re-encoded code blocks where re-encoded code blocks with tag (0) result in a symbol with data and re-encoded code blocks with tag (1) result in a symbol with zero values, which in an embodiment comprises the RMAP circuits 404. The apparatus 600 also comprises means (616) for utilizing the reconstructed symbols to cancel interference on symbols from the targeted UE, which in an embodiment comprises the equalizer 408.

While particular embodiments of the present invention have been shown and described, it will be obvious to those skilled in the art that, based upon the teachings herein, changes and modifications may be made without departing from these exemplary embodiments of the present invention and their broader aspects. Therefore, the appended claims are intended to encompass within their scope all such changes and modifications as are within the true spirit and scope of this exemplary embodiments of the present invention.

What is claimed is:

1. A successive interference cancellation ("SIC") system capable of removing at least a portion of interference signals, comprising:
    a plurality of non-target decoder circuits configured to encode code blocks ("CBs") from multiple non-target user equipments ("UEs") via a wireless network;
    a plurality of re-mapper ("RMAP") circuits coupled to the plurality of non-target decoder circuits and configured to generate reconstructed non-target symbols based on the CBs; and
    an SIC circuit coupled to the plurality of RMAP circuits and configured to remove interference signals by subtracting interference signals of the reconstructed non-target symbols from interfered signal of target symbols from a target UE.

2. The SIC system of claim 1, further includes a receiver that receives symbols from a plurality of user equipment (UE).

3. The SIC system of claim 1, wherein each of the plurality of non-target decoder circuits includes a decoder configured to decode code blocks from symbols received from a non-target UE for generating decoded bits for each code block.

4. The SIC system of claim 3, wherein the decoder performs a cyclic redundancy check (CRC) check on the decoded bits for each code block to generate a tag.

5. The SIC system of claim 4, wherein the tag for each code block has a first state (0) when the CRC check passes and a second state (1) when the CRC check fails.

6. The SIC system of claim 3, wherein each of the plurality of non-target decoder circuits includes a re-encoder configured to re-encode the decoded bits to generate re-encoded code blocks.

7. The SIC system of claim 3, wherein tags associated with the code blocks are attached to re-encoded code blocks.

8. The SIC system of claim 1, wherein each of the plurality of RMAP circuits includes a symbol reconstruction circuit configured to reconstruct symbols from re-encoded code blocks.

9. The SIC system of claim 8, wherein symbols reconstructed from the re-encoded code blocks having tag (0) are reconstructed with data.

10. The SIC system of claim 8, wherein symbols reconstructed from re-encoded code blocks having tag (1) are reconstructed as zero value symbols.

11. A method for reducing interference signals for a network transmission comprising:
    generating reconstructed non-target symbols by one or more re-mapper ("RMAP") circuits based on one or more encoded code blocks ("CBs") from one or more non-target equipments ("UEs") via a wireless network;
    reducing interference signals from interfered signals of target symbol in response to the reconstructed non-target symbols;
    generating an interference-canceled signal upon removing the interference signals from the interfered signals; and
    identifying target symbols from a targeted UE and non-target symbols from the one or more non-targeted UEs.

12. The method of claim 11, further comprising decoding transport blocks ("TBs") of non-target symbols from the non-targeted UEs via an uplink transmission.

13. The method of claim 12, further comprising generating reconstructed non-target symbols in accordance of the TBs and cyclic redundancy check ("CRC") values associated with the TBs.

14. The method of claim 12, wherein decoding TBs of the non-target symbols includes generating decoded bits for each code block within TB.

15. The method of claim 12, wherein decoding TBs of the non-target symbols includes performing a cyclic redundancy check ("CRC") check on decoded bits for each code block to generate a tag, and wherein the tag for each code block has a first state (0) when the CRC check passes and a second state (1) when the CRC check fails.

16. The method of claim 11, wherein generating reconstructed non-target symbols includes re-encoding decoded bits to generate re-encoded code blocks, and wherein tags associated with the code blocks are attached to the re-encoded code blocks.

17. The method of claim 11, wherein generating reconstructed non-target symbols includes reconstructing symbols from re-encoded code blocks, and wherein symbols reconstructed from the re-encoded code blocks having tag (0) are reconstructed with data and symbols reconstructed from re-encoded code blocks having tag (1) are reconstructed as zero value symbols.

18. The method of claim 11, further comprising activating an equalizer to remove inter-symbol-interference ("ISI") upon removal of the interference signals.

19. The method of claim 11, further comprising receiving symbols in a plurality of uplink transmissions from the plurality of UE.

20. The method of claim 11, further comprising determining the code blocks from transport blocks received from the non-target UEs.

21. An apparatus capable of removing at least a portion of interference signals, comprising:
    a receiving block configured to receive first code blocks ("CBs") from non-target devices and second CBs from target device; and
    a successive interference cancellation ("SIC") system coupled to the receiving block and configured to include,
    a plurality of symbol reconstruction circuits operable to generate reconstructed non-target symbols based on the first CBs;
    an SIC circuit configured to remove interference by subtracting interference signals of the reconstructed non-target symbols from interfered signal of target symbols from the target device.

22. The apparatus of claim 21, wherein the SIC system includes a plurality of non-target decoder circuits configured to encode the first CBs from multiple non-target devices via a wireless network.

23. The apparatus of claim 21, wherein the SIC circuit includes a decoder for decoding the first CBs from symbols received from non-target device for generating decoded bits for each CB.

24. The apparatus of claim 21, wherein the SIC circuit includes a decoder for performing a cyclic redundancy check ("CRC") check on decoded bits for each CB for generating a tag, and wherein the tag for each CB has a first state (0) when the CRC check passes and a second state (1) when the CRC check fails.

25. The apparatus of claim 21, wherein the SIC circuit includes a re-encoder configured to re-encode decoded bits for generating re-encoded CBs.

26. An apparatus for reducing interference signals for a network transmission comprising:
    means for generating reconstructed non-target symbols by one or more re-mapper ("RMAP") circuits based on one or more encoded code blocks ("CBs") from one or more non-target equipments ("UEs") via a wireless network;

means for reducing interference from interfered signals of target symbol in response to the reconstructed non-target symbols;

means for generating an interference-canceled signal upon removing the interference signals from the interfered signals; and means for identifying target symbols from a targeted UE and non-target symbols from one or more non-targeted UEs.

27. The apparatus of claim 26, further comprising means for decoding transport blocks ("TBs") of non-target symbols from the non-targeted UEs via an uplink transmission.

28. The apparatus of claim 27, further comprising means for generating the reconstructed non-target symbols in accordance of the TBs and cyclic redundancy check ("CRC") values associated with the TBs.

29. The apparatus method of claim 27, wherein means for decoding TBs of the non-target symbols includes means for generating decoded bits for each code block within TB.

30. The apparatus of claim 26, wherein means for generating reconstructed non-target symbols includes means for reconstructing symbols from the re-encoded code blocks.

* * * * *